(12) United States Patent
Wiley et al.

(10) Patent No.: US 9,417,668 B2
(45) Date of Patent: Aug. 16, 2016

(54) SUN SHADE CASE FOR A PORTABLE COMPUTING DEVICE

(71) Applicants: Nicholas Wiley, Littlestown, PA (US); Judy Wiley, Littlestown, PA (US)

(72) Inventors: Nicholas Wiley, Littlestown, PA (US); Judy Wiley, Littlestown, PA (US)

( * ) Notice: Subject to any disclaimer, the term of this patent is extended or adjusted under 35 U.S.C. 154(b) by 0 days.

(21) Appl. No.: 14/309,445

(22) Filed: Jun. 19, 2014

(65) Prior Publication Data

US 2015/0370291 A1    Dec. 24, 2015

Related U.S. Application Data

(60) Provisional application No. 61/838,934, filed on Jun. 25, 2013.

(51) Int. Cl.
| | |
|---|---|
| *G06F 1/18* | (2006.01) |
| *A45C 11/00* | (2006.01) |
| *G06F 1/16* | (2006.01) |
| *H04N 5/225* | (2006.01) |
| *H04N 5/232* | (2006.01) |

(52) U.S. Cl.
CPC .............. *G06F 1/181* (2013.01); *A45C 11/00* (2013.01); *G06F 1/1626* (2013.01); *G06F 1/1686* (2013.01); *H04N 5/2257* (2013.01); *H04N 5/23293* (2013.01); *A45C 2011/003* (2013.01); *A45C 2200/15* (2013.01)

(58) Field of Classification Search
CPC ......... G06F 1/181; G06F 1/18; G06F 1/1626; G06F 1/1686; H04N 5/2257; H04N 5/23293; A45C 2200/15; A45C 2011/003

USPC ............ 206/320, 751, 754, 753, 45.23, 45.2, 206/38; 354/612
See application file for complete search history.

(56) References Cited

U.S. PATENT DOCUMENTS

| | | |
|---|---|---|
| 4,612,583 A | 9/1986 | Ayervais |
| 5,233,468 A | 8/1993 | McNulty |
| 5,762,250 A | 6/1998 | Carlton et al. |
| 5,988,823 A | 11/1999 | Wong |
| 6,084,711 A | 7/2000 | Duff |
| 6,144,419 A | 11/2000 | Schmidt |
| 6,394,615 B1 | 5/2002 | Hill et al. |
| 6,772,883 B2 | 8/2004 | Lindamood |
| D514,582 S | 2/2006 | Dulberger |
| D530,719 S | 10/2006 | Roubanis |
| 7,303,077 B2 | 12/2007 | Harlocker |
| 7,508,657 B1 | 3/2009 | Smith |
| 8,109,421 B2 | 2/2012 | Mclean et al. |
| 2004/0206645 A1 | 10/2004 | Roubanis |
| 2011/0011759 A1* | 1/2011 | Luo .......................... A45C 5/03 206/320 |
| 2013/0341233 A1 | 12/2013 | Dow |

* cited by examiner

*Primary Examiner* — King M Chu
(74) *Attorney, Agent, or Firm* — Leveque Intellectual Property Law, P.C.

(57) ABSTRACT

The present portable computing device case is configurable for both carrying a portable computing device and for obstructing external lighting while using a portable computing device in an upright viewing position, particularly for augmented reality applications, outdoor gaming applications and for use of a digital camera housed within the portable computing device.

12 Claims, 3 Drawing Sheets

SUN SHADE CASE FOR A PORTABLE COMPUTING DEVICE

FIELD

The present portable computing device case is configurable for both carrying a portable computing device and for obstructing external lighting while using a portable computing device in a viewing position, particularly for augmented reality applications.

BACKGROUND

As more individuals are purchasing portable computing devices, a market exists for devices for carrying the portable computing devices. These carrying devices are typically designed to be highly portable and facilitate the user's ability to carry the device easily while also providing some degree of protection from various environmental factors. Common examples of these devices are the Apple iPad and the Samsung Galaxy Note 10.1, both of which are tablet computing devices with touchscreen interfaces, camera capabilities, and large color displays.

A growing variety of uses for these portable computing devices, particularly tablet computers, are being found. Rich interactive content is becoming increasingly popular as more entities are creating applications for use on portable computing devices. Increasingly, applications are being created for portable computing devices that are to be used in circumstances where external lighting may interfere with the usage of the application. Such applications include augmented reality applications where the portable computing device provides informative overlays over the user's current field of view. The screens of the portable computing devices, including the Apple iPad and the Samsung Galaxy Note 10.1, typically suffer glare and other issues when used outside. The user of such portable computing devices may also not perceive the rich interactive contents displayed on the screen as easily when used for viewing augmented reality applications outside.

A search of the prior art discloses some relevant information, however, none of the prior art discloses the present invention that discloses an external light blocking enclosure, privacy protection function, and prop mechanism integrated into a case for electronic tablet computer made specifically for viewing tablet computers in an upright position in bright light in conjunction with full facility of the camera for viewing outdoor augmented reality.

It would be desirable to have a case for encasing and carrying the portable computing device while providing a means of controlling the external lighting so that the user may use the application in an upright viewing position without glare and other lighting effects interfering with the user's interaction with the tablet camera and augmented reality, gaming and photography applications.

Portable computing devices are being used in a variety of contexts, including public areas. Increasingly, users may desire privacy when using their portable computing device for a variety of reasons. The user may need privacy for an extended period of time. It would be desirable to have a device for carrying the portable computing device and for also providing a means of comfortably providing privacy so that the user may use the portable computing device in any context.

The increasing popularity and user friendliness of portable computing devices causes these devices to be used in circumstances where ease of use and simplicity are desired. For example, an entity may wish to provide a case for portable computing devices that are loaned to individuals so that rich interactive content created by the entity may be enjoyed by the individuals. The portable computing devices would need to be easily carried by the individuals in a secure manner so that the portable computing devices may be returned to the entity after use. It would be desirable to have an affordable device for carrying the portable computing device housed in a shockproof case, for example, for also providing a means of ensuring that rich interactive content may be enjoyed.

SUMMARY

It would be advantageous to have a case for a portable computing device that includes a bottom portion, a top portion, side portions on opposing sides of the bottom portion, the side portions extending in an upward direction perpendicular to the bottom portion, a front portion extending in the upward direction perpendicular to the bottom portion, the front portion disposed between the side portions, a back portion joining the bottom portion and the top portion, a front wall connected to the top portion, opposing side walls connected to the top portion and the front wall in a collapsible manner. The case has an enclosing configuration, where the front wall, the top portion, the side portions, the front portion, the back portion, and the bottom portion define an enclosure where the side walls are extended and parallel, the front wall, the top portion, and the bottom portion defining a substantially rectangular enclosure. The case has a carrying configuration, where the top portion, the side portions, the front portion, the back portion, and the bottom portion define an enclosure where the top portion is substantially parallel to the bottom portion, and the back portion is disposed parallel to the front portion and extending in the upward direction perpendicular to the bottom portion.

It would also be advantageous to have a case for a portable computing device case that includes an attachment portion configured to secure the case to the portable computing device, a top portion, side walls on opposing sides of the top portion, a front wall disposed between the side portions and connected to the side portions forming a rectangular enclosure.

The details of one or more embodiments of the disclosure are set forth in the accompanying drawings and the description below. Other features, objects, and advantages will be apparent from the description and drawings, and from the claims.

DRAWINGS

BEST MODES OF CARRYING OUT THE INVENTION

The present portable computing device holder is a carrying case that has four distinct configurations. The four different configurations include a carrying configuration, a loading configuration, an enclosing configuration and a standing configuration. The case described by the present disclosure is able to assume these different configurations to provide distinct and useful functions for a user.

Figure 1:
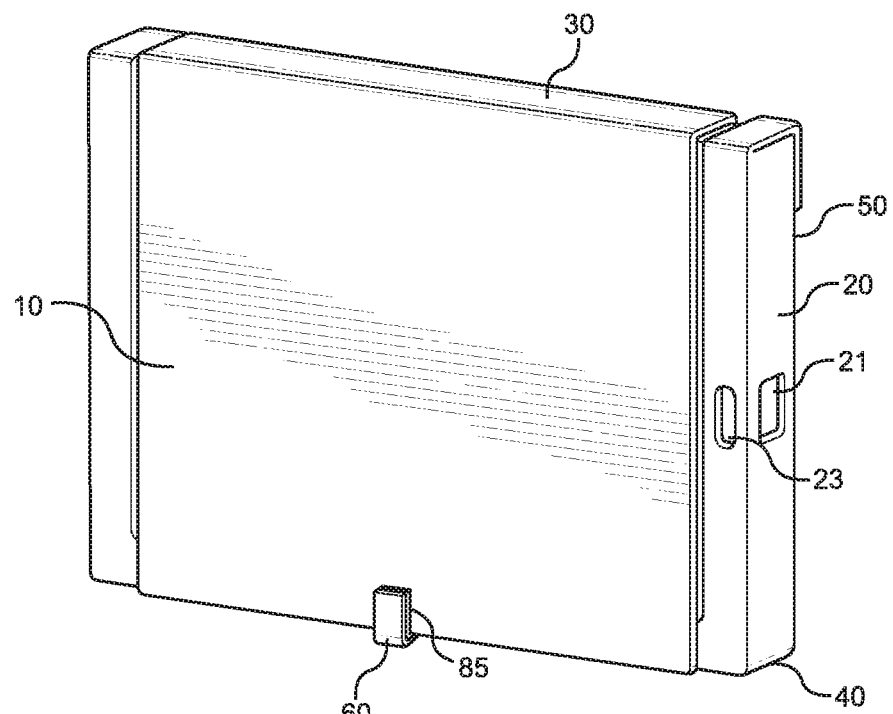
FIG. 1 illustrates an embodiment of the case in a carrying configuration.

FIG. 1 illustrates one embodiment of the present portable computing device holder.

The illustrated embodiment is in the carrying configuration. The case 1 is dimensioned to secure a typical portable computing device, such as, for example, a tablet computer or an electronic book reader. The case, when in the carrying configuration, encloses and secures the portable computing device which may be housed in a separate shockproof case. The illustrated case includes a top portion 10 that includes a latch 60 attached to the connecting latch 85. A back portion 30 is positioned opposite a front portion 40 when the case is in the carrying configuration. The back portion 30 functions both as a hinge and as an additional securing wall for helping secure the portable computing device in the carrying configuration. The back portion 30 connects the top portion 10 and a bottom portion 50. Two side portions 20 are positioned opposite each other. The front portion 40 and two side portions 20 extend upward from the bottom portion 50. When in the carrying configuration, the top portion 10 is positioned parallel and opposite the bottom portion 50, and the back portion 30 is positioned parallel and opposite the front portion 40. In the carrying configuration, the portable computing device is fully enclosed by the case, other than optional ports to control switches (e.g., volume control, home key 23, mute buttons, opening to expose the lens of a camera module, opening for an audio jack, opening for a power/data transfer cord 21, as examples). The top portion 10, the two side portions 20, the back portion 30 and the front portion 40, and the bottom portion 50 define six sides that form an enclosure for securing the portable computing device.

Figure 2:
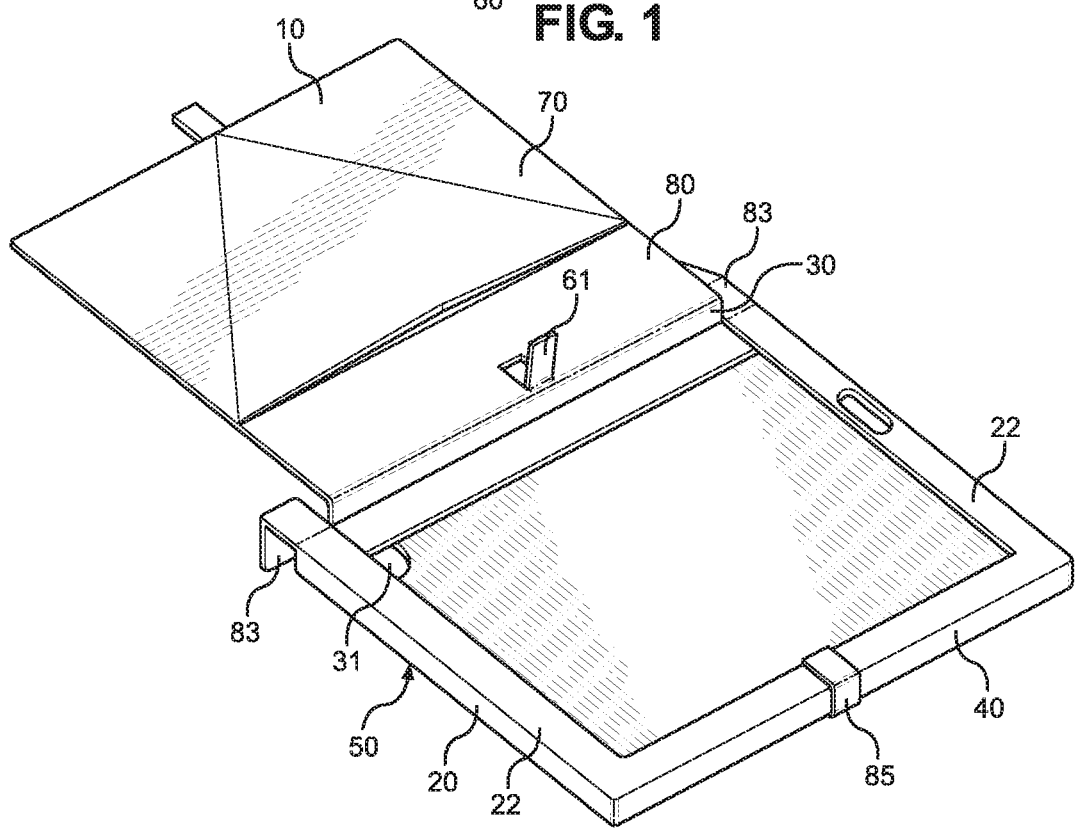
FIG. 2 illustrates the embodiment of the case shown in FIG. 1 in a loading configuration.

FIG. 2 illustrates an embodiment of the case shown in FIG. 1 in a loading configuration. When the case is in a loading configuration, the top portion 10, back portion 30, and bottom portion 50 are arranged in a coplanar fashion. In the depicted disclosure, the front wall 80 is arranged in a stowed and collapsed position adjacent to the top portion 10. The portable computing device may be inserted in a direction from the (back portion 30) towards the front portion 40 and secured with enclosing flaps 83 from each side portion 22 to the bottom portion 50. These enclosing flaps 83 can be constructed with Velcro, snaps or other forms known in the art.

In an alternate embodiment, these latches may connect from the bottom portion 50 origin to the side portions 22.

In an alternate embodiment, the case may include at least one side portion 22 or a front portion 40 that includes a flap that allows for another means of loading and securing the portable computing device in the case. This may be desirable when, for example, the case is in the enclosing configuration and it is desired to view the surroundings through the portable computing device's camera device.

An opening 31 in the bottom portion 50 is illustrated. The opening exposes the lens of a digital camera. The size and location of this port may be altered to allow for multiple possible placements on various electronic tablets.

Figure 3:
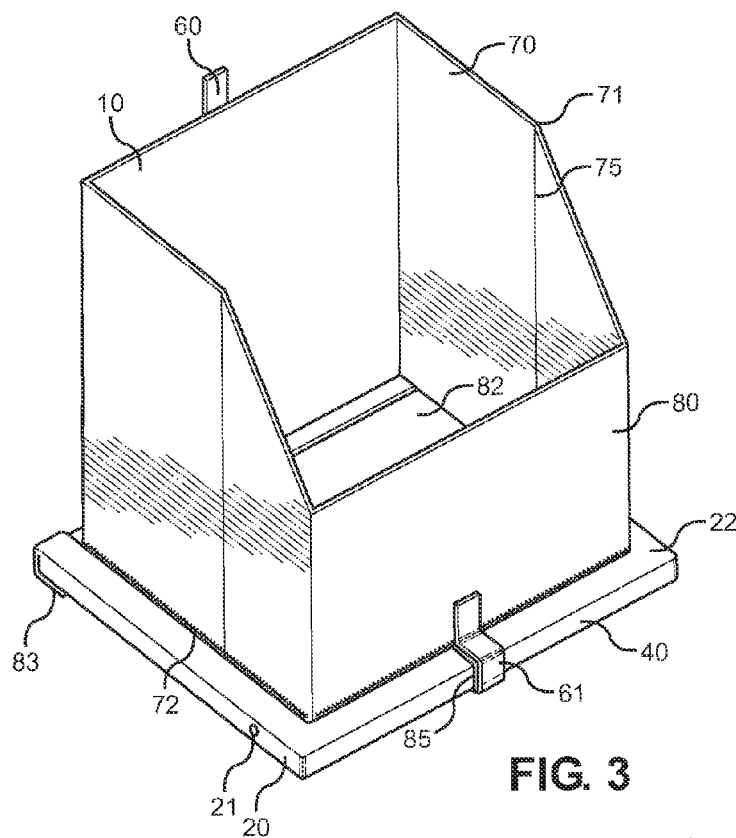
FIG. 3 illustrates the case in an enclosing configuration.

FIG. 3 illustrates an embodiment of the present portable computing device holder in the enclosing configuration. In the enclosing configuration, a front wall 80 is connected to the top portion 10 via two side walls, 70. The two side walls 70 are extended when they define two parallel planes on opposite sides of the electronic tablet viewing screen, 82. FIG. 3 shows one embodiment of the case where the side walls 70 include side wall folds 71 supported by an interior snap hinge 75.

When in the enclosing configuration, the top portion 10 and the front wall 80 are parallel to one other. In the enclosing configuration shown in FIG. 3, the side walls 70 and the front wall 80 are extended. In the embodiment shown in FIG. 3, when the side walls 70 are extended, side wall folds 71 are substantially perpendicular to the bottom portion when the case is in the enclosing configuration. The front wall 80, top portion 10, and bottom portion 50 define a substantially trapezoidal shape when the case is in an enclosing configuration. The front wall 80 is arranged to help substantially enclose the viewable screen of the portable computing device.

In an alternate embodiment, the dimensions of front wall 80 match top portion 10 to create an essentially rectangular shape with the bottom portion 50. This embodiment permits the user to view the tablet in a portrait orientation. A surface feature 72, along the bottom edges of the side walls provides additional securing function and additional protection from external light sources.

In the illustrated embodiments, the side wall folds 71 are supported with an interior snap hinge 75 that essentially supports the coplanar position in the enclosing configuration and then collapses the side walls 70 in a compact manner when the case 1 is not in the enclosing configuration. When the side walls 70 are collapsed in a compact manner, the front wall 80 is positioned adjacent to the top portion 10. FIG. 2 depicts one embodiment where the front wall 80 is held next to the top portion 10 by the collapsed side walls 70. The top portion 10 and front wall 80 when held adjacent to the bottom portion 50 do not interfere with the tablet's digital camera port.

A front wall latch 61 is shown in FIG. 3 and helps ensure that the enclosing configuration of the case is maintained. In particular, the front wall latch 61 is attached to the front portion 40 via connecting latch 85 so that the substantially trapezoidal shape of the case in the enclosing configuration, shown in FIG. 3, is maintained without requiring the user to consciously maintain the particular shape of the case. The front wall latch 61 may be attached to the front portions 22 and or 40 by way of any fastening means known in the art that may be secured and unsecured repeatedly and easily. Alternate embodiments may use Velcro, buttons, snaps, or other devices known in the art.

Figure 4:
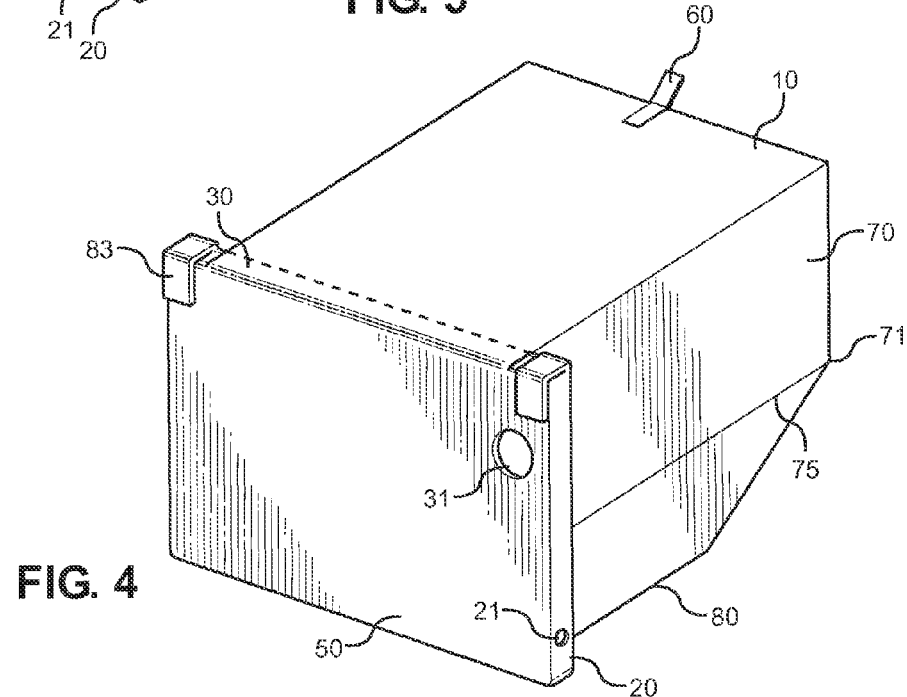
FIG. 4 illustrates a rear perspective of the case shown in FIG. 3.

FIG. 4 illustrates the case shown in FIG. 3 from the perspective of the bottom portion as prominent. The securing mechanism 83 extends from side portions 22 shown in FIG. 3 to attach to the bottom portion 50. This allows the opening for the loading configuration shown in FIG. 2 and secures the electronic device in the case. The securing mechanism may be constructed with Velcro, snaps, or other materials known in the art.

In an alternate embodiment, these securing mechanisms originate from the bottom portion 50 and are secured along the side portions 22. An opening 31 in the bottom portion 50 provides clearance for the lens of a digital camera for using the case in the enclosed viewing configuration.

Figure 5:
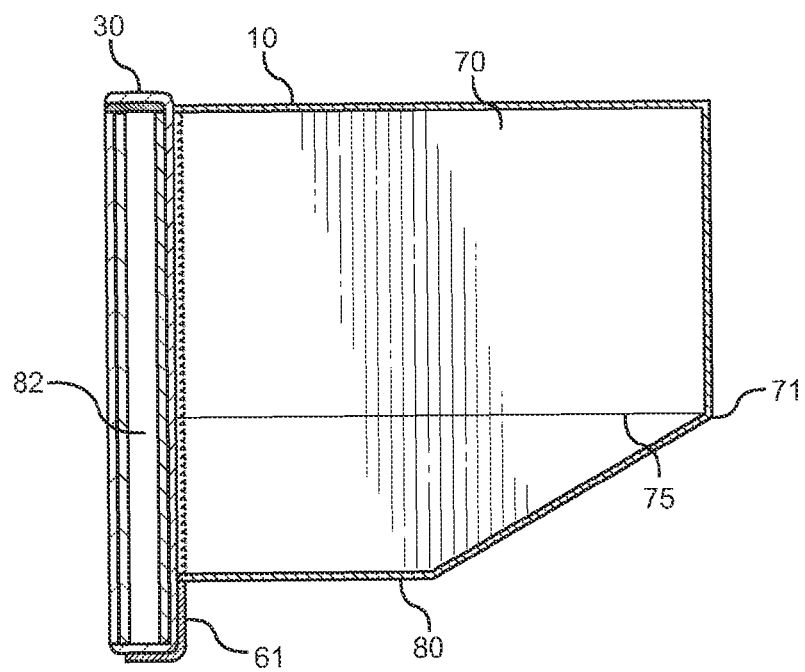
FIG. 5 illustrates a cross-section perspective of the case shown in FIG. 3.

FIG. 5 illustrates the enclosing configuration of the case from a cross section perspective. The fold 71 is supported by an internal snap hinge 75 that supports the side walls in a planar fashion while in the enclosing configuration. The snap hinge 75 in the fold 71 also closes the enclosing portion of the case so that the front wall 80 is brought adjacent to the top portion 10 when in the carrying configuration. The surface feature 82 provides a gasket function for a tight seal between the electronic tablet and the side walls 70. Latch 61 connects the front wall 80 to the latch connector 85 shown in FIG. 3. An electronic computing device is encased in the space 82 also shown in FIG. 3.

The case in enclosing configuration shown in FIGS. 3, 4 and 5 helps obstruct external light and provides a darkened enclosure for the portable computing device. The darkened enclosure is desirable in circumstances where external light would impair a user's ability to enjoy a rich interactive contact in a comfortable manner. The enclosure also helps provide privacy for a user so that the ability to eavesdrop on the content being viewed on the portable computing device may be reduced. While in the enclosing configuration, the case fully supports the weight of the portable computing device so that the user may concentrate on viewing and operating the portable computing device while knowing that the portable computing device is securely held in the case. Other methods of maintaining the configuration of the case are known in the art and are not specifically enumerated here. In an alternate embodiment, the surface feature 21 provides access to the speaker port of the portable computing device.

When the case is configured in this manner, the external light that illuminates the display of the portable computing device is substantially reduced. A user viewing the portable computing device in the enclosed viewing position will see the portable computing device in a darkened environment, even when the surrounding environment is well lit. A user viewing the portable computing device in the enclosed position will also have a reduced view of the surrounding environment due to the top portion 10, the front wall 80, the side walls 70, and the bottom portion 50 forming an enclosure for the portable computing device.

Figure 6:
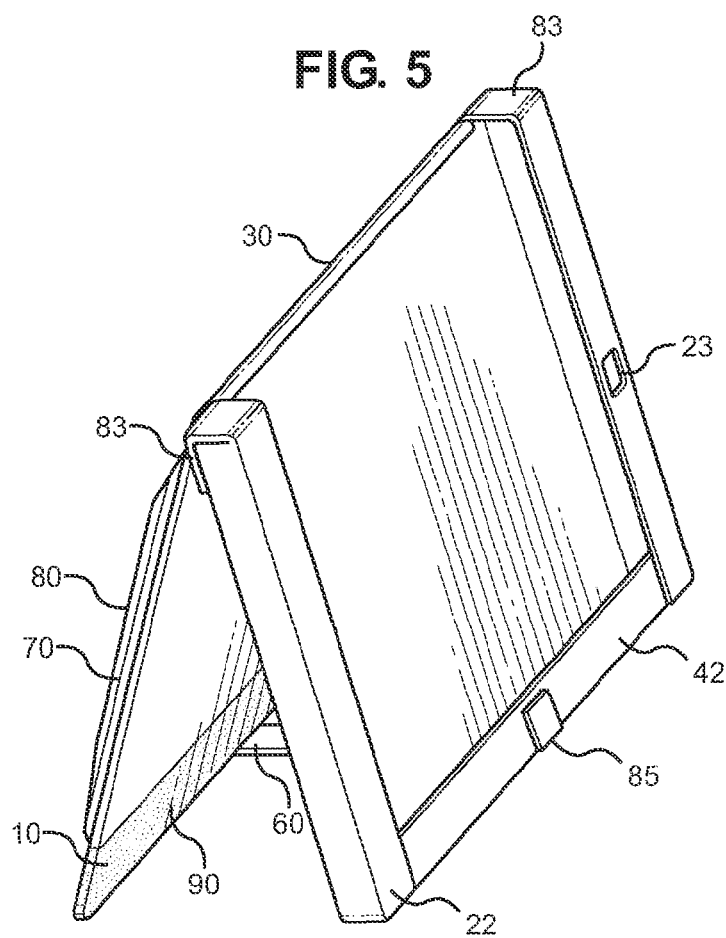
FIG. 6 illustrates the case in the standing configuration.

FIG. 6 illustrates the case in a standing configuration. The enclosing portion that includes the top portion 10, the front wall 80, and the side walls 70 form a supporting structure extending from the back portion 30 to support the case. The latch 60 can be extended to attach to latch 85 shown also in FIG. 2 to secure alternate positions. An alternate embodiment includes a surface friction feature 90 on the edge of top portion 10 to form a non-slip engagement with the mounting surface. This allows the portable computing device to be positioned in a manner that is desirable for viewing by a typical individual. The cover allows for multiple standing configurations so that the user may select the most desirable configuration for their situation.

In an alternate embodiment, at least one of the side portion securing portions and front portion securing portion is configured to provide a snap fit. In other words, one of the portions may be adjusted to apply a physical friction fit between the case and the portable computing device, helping to secure the portable computing device within the case. The snap fit helps ensure the portable computing device remains in a consistent position when the device is being carried in the case.

In an alternate embodiment, pliable material may line the interior of the case in a manner that provides the pliable material between the interior surfaces of the case and the surfaces of the portable computing device. The pliable material of these embodiments of the case may be considered to be part of the securing mechanism because the pliable material helps ensure the portable computing device remains in a consistent position being carried or enclosed in the case. In one such embodiment, the portable computing device is inserted by the user which causes the pliable material lining the interior of the case to deform. The pliable material lining can be applied to make sizing adjustments to allow for use of the digital camera module ports in alternate personal computing devices and cases.

The case may be formed in an integral manner. In such an embodiment, the case can be made of one continuous piece of material. Such embodiments may be used in circumstances where a low cost of manufacture is essential. Such embodiments may be formed in a manner that includes surface features like folds 71 supported by a snap hinge 75 which help facilitate the formation of the case. In other embodiments, the case may be formed from multiple different pieces, allowing for a person of ordinary skill in the art to choose the most suitable material for each portion of the case.

The case may be made of any suitable material known in the art. In one embodiment, the case is made of leather, a leather-like material and/or fabric. In an alternate embodiment, the case is made of a plastic or metallic material. In another embodiment, the case is made of a paper or paperboard material. Various combinations of these materials selected for form, function and design are within the scope of this disclosure. Embodiments of the case will have particular surfaces that are defined as the exterior and the interior surfaces. In some embodiments, surface indicia may be included on the interior or the exterior surfaces of the case. These indicia may provide identification, branding, maps, instructions, decoration, pockets, and/or other information. The material used to form the case maintains the specific shape of the case. In alternate embodiments, the material may provide protection to the portable computing device. In further embodiments, the case may be made of multiple layers of material with different properties. For example, the outermost layer may an environmentally resilient waterproof outer plastic layer. Other layers may include pliable materials that provide shock absorption and securing attributes, or structurally resilient materials that provide structure to the case. The innermost layer is desirably made of a material that will not affect the finish of the portable computing device while still securely holding the portable computing device. Still further layers may provide a variety of other attributes known to people of skill in the art.

The case may include other aspects that facilitate the use of the case as a means of carrying and enclosing the portable computing device. In an alternative embodiment, features are included that allow the case to be elevated in a manner that facilitates viewing. These features may include use of the enclosing portion as a support stand, a removable stand, a retractable stand, or other structures known in the art. A stand, for example, allows the case to achieve an additional standing configuration that allows the user to view the portable computing device without requiring the user to continuously provide support the case to achieve an optimal viewing angle. In a further embodiment, features may include a handle or a strap that facilitates the carrying of the case. These and other features may be arranged on any of the external surfaces of the case to facilitate ease of use by the user.

The case is particularly suited for augmented reality applications, particularly those involving outdoor activities. See, for example, U.S. Patent Application No. 2013/0130813 (Ackley); U.S. Patent Application No. 2013/0095924 (Geisner); and U.S. Patent Application No. 2013/0093788 (Liu), for instance, herein incorporated by reference. As would be readily understood by those skilled in the art, the portable computing device would have a digital camera, a processor and a memory. The portable computing device would be housed within the top portion, the side portions, the front portion and the back portion, and would display both a current view of that which is within the viewing range of the digital camera, as well as images of objects generated by the portable computing device to create an augmented reality.

For instance, the augmented reality applications can involve looking at the computing device display screen outdoors on a sunny day. Without the viewer case, the reflection and glare of on the display surface would prevent or cause eye strain on the user wishing to see the content on the screen. The user can be on an open field, e.g., an historic battlefield, look through the enclosure to the display screen to see the field through the camera function on the computer device, as augmented, for instance, by historic films, avatars or reinactors that recreate a historic battle. The determined geographic location (GPS, cell tower or WiFi derived location information) and orientation (through the magnetic/compass function) can govern what is displayed, such that as one walks about and rotates, various perspectives can be viewed. An interactive map application, either separate or integral with the augmented reality application can direct the user to the next viewing location. Various events can be viewed by selecting a particular day or historic event, but allowing the user to shift through time for a particular location. Thus, while being in the actual environment, a user can have an experience that simulated an imbedded, interactive, location and time-shifted experience of a recreated historic event. Of course, the case permits many other applications to be viewed, not just applications directed to history, such as virtual reality games, mapping applications, and other educational content.

The case includes various openings for viewing and accessing the portable computing device. The openings may also be used to attach speakers, chargers, straps, and other devices desirable for use with a case for a portable computing device.

It will be understood that the foregoing description is of the exemplary embodiments, and is, therefore, merely representative of the article. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

The invention claimed is:

1. A case for holding an electronic device and comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;
a back portion joining the bottom portion and the top portion;
opposing side walls connected to the top portion and a front wall in a collapsible manner;
the front wall connected to the top portion via the opposing side wall;
the case having an enclosing configuration, the front wall, the top portion, and the side walls, the side portions, the front portion, the back portion, and the bottom portion defining an enclosure where the side walls are extended and parallel, the front wall, the top portion, and the bottom portion defining a substantially rectangular enclosure;
the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion; and
the case having a standing configuration wherein the top portion, the side walls, and the front wall collapse and are folded via the back portion, the top portion providing a supporting structure, wherein the top portion, the side walls, and the front wall may be moved parallel to the back portion without obstructing a digital camera module lens in a portable computing device housed within the top portion, the side portions, the front portion and the back portion.

2. The case according to claim 1, wherein the case includes a securing mechanism for securing the electronic device.

3. A case for holding an electronic device and comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;
a back portion joining the bottom portion and the top portion;
opposing side walls connected to the top portion and a front wall in a collapsible manner;
the front wall connected to the top portion via the opposing side wall; and
a securing mechanism for securing the electronic device, wherein the securing mechanism comprises a side portion securing portion formed on each side portion and a front portion securing portion formed on the front portion,
the case having an enclosing configuration, the front wall, the top portion, and the side walls, the side portions, the front portion, the back portion, and the bottom portion defining an enclosure where the side walls are extended and parallel, the front wall, the top portion, and the bottom portion defining a substantially rectangular enclosure;
the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion; and
the case having a standing configuration wherein the top portion, the side walls, and the front wall collapse and are folded via the back portion, the top portion providing a supporting structure.

4. A case for holding an electronic device and comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;
a back portion joining the bottom portion and the top portion;
opposing side walls connected to the top portion and a front wall in a collapsible manner; and
the front wall connected to the top portion via the opposing side wall;
the case having an enclosing configuration, the front wall, the top portion, and the side walls, the side portions, the front portion, the back portion, and the bottom portion defining an enclosure where the side walls are extended and parallel, the front wall, the top portion, and the bottom portion defining a substantially rectangular enclosure, wherein a front wall latch extends from the front wall and is secured to the front portion when the case is in the enclosing configuration;
the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion; and the case having a standing configuration wherein the top portion, the side walls, and the front wall collapse and are folded via the back portion, the top portion providing a supporting structure.

5. A case for holding an electronic device and comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;
a back portion joining the bottom portion and the top portion;
opposing side walls connected to the top portion and a front wall in a collapsible manner, wherein the side walls include a surface feature and snap hinge to maintain the enclosing configuration; and
the front wall connected to the top portion via the opposing side wall,
the case having an enclosing configuration, the front wall, the top portion, and the side walls, the side portions, the front portion, the back portion, and the bottom portion defining an enclosure where the side walls are extended and parallel, the front wall, the top portion, and the bottom portion defining a substantially rectangular enclosure,
the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion; and
the case having a standing configuration wherein the top portion, the side walls, and the front wall collapse and are folded via the back portion, the top portion providing a supporting structure.

6. The case according to claim 1, the case having a loading configuration, the top portion, the back portion, and the bottom portion defining a plane so that the electronic device and a separate case may be inserted without adjusting the side portions or the front portion.

7. A combination of portable computing device and case for holding the portable computing device comprising:
a bottom portion and a top portion;
side portions disposed on opposing sides of the bottom portion, the side portions extending in an upward direction perpendicular to the bottom portion;
a front portion extending in the upward direction perpendicular to the bottom portion, the front portion disposed between the side portions;
a back portion joining the bottom portion and the top portion;
a front wall connected to the top portion via opposing side walls connected to the top portion and the front wall in a collapsible manner;
the case having an enclosing configuration, the front wall, the top portion, the opposing side walls, the side portions, the front portion, the back portion, and the bottom portion defining an enclosure where the opposing side walls are extended and parallel, the front wall, the top portion, the opposing side walls, and the bottom portion defining a substantially rectangular enclosure;
the case having a carrying configuration, the top portion, the side portions, the front portion, the back portion, and the bottom portion defining an enclosure where the top portion is substantially parallel to the bottom portion, and the back portion is disposed parallel to the front portion and extending in the upward direction perpendicular to the bottom portion; and
wherein the top portion, the opposing side walls and the front wall may be moved parallel to the back portion without obstructing a digital camera module lens in the portable computing device;
wherein the portable computing device has a digital camera, a processor and a memory, wherein the portable computing device is housed within the top portion, the side portions, the front portion and the back portion, and
wherein the portable computing device displays both a current view of that is within the viewing range of the digital camera, as well as images of objects generated by the portable computing device to create an augmented reality.

8. The combination according to claim 7, wherein the viewing case includes a securing mechanism for securing the electronic device.

9. The combination according to claim 8, wherein the securing mechanism comprises a side portion securing portion formed on each side portion and a front portion securing portion formed on the front portion.

10. The combination according to claim 7, wherein a front wall latch extends from the front wall and is secured to the front portion when the viewing case is in the enclosing configuration.

11. The combination according to claim 7, wherein the opposing side walls include a surface feature and snap hinge for maintaining the enclosing configuration.

12. The combination according to claim 7, the case having a loading configuration, the top portion, the back portion, and the bottom portion defining a plane so that the electronic device may be inserted without adjusting the side portions or the front portion.

* * * * *